United States Patent
Agrawal et al.

(10) Patent No.: US 10,306,434 B2
(45) Date of Patent: May 28, 2019

(54) CONFIGURING MOBILE DEVICE IN AN ACTIVITY CONFIGURATION RESPONSIVE TO A RECREATIONAL IMPLEMENT BEING IN A USE CONFIGURATION

(71) Applicant: Motorola Mobility LLC, Chicago, IL (US)

(72) Inventors: Amit Kumar Agrawal, Bangalore (IN); Soumya Ranjan Mund, Bangalore (IN); Scott Patrick DeBates, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/448,115

(22) Filed: Mar. 2, 2017

(65) Prior Publication Data

US 2018/0255420 A1    Sep. 6, 2018

(51) Int. Cl.
*H04M 1/725* (2006.01)
*H04W 4/60* (2018.01)
*H04W 4/80* (2018.01)
*H04W 4/02* (2018.01)
*H04M 1/60* (2006.01)

(52) U.S. Cl.
CPC ........ *H04W 4/60* (2018.02); *H04M 1/72569* (2013.01); *H04W 4/80* (2018.02); *H04M 1/6008* (2013.01); *H04W 4/023* (2013.01)

(58) Field of Classification Search
None
See application file for complete search history.

(56) References Cited

U.S. PATENT DOCUMENTS

| 2015/0156567 | A1* | 6/2015 | Oliver | H04Q 9/00 340/870.07 |
| 2017/0092320 | A1* | 3/2017 | Gehring | G10H 1/0033 |
| 2017/0245128 | A1* | 8/2017 | Cronholm | H04W 76/14 |

* cited by examiner

*Primary Examiner* — Alejandro Rivero
(74) *Attorney, Agent, or Firm* — John L. Rogitz

(57) ABSTRACT

A sensor indicates when a recreational implement such as a musical instrument or sporting gear is about to used, to configure a mobile device with an activity configuration, such as opening an app associated with the implement, only when the implement is determined to be proximate to the mobile device and is being or is about to be used, as may be indicated by, e.g., the sensor being located to detect when a container of the implement is open.

20 Claims, 6 Drawing Sheets

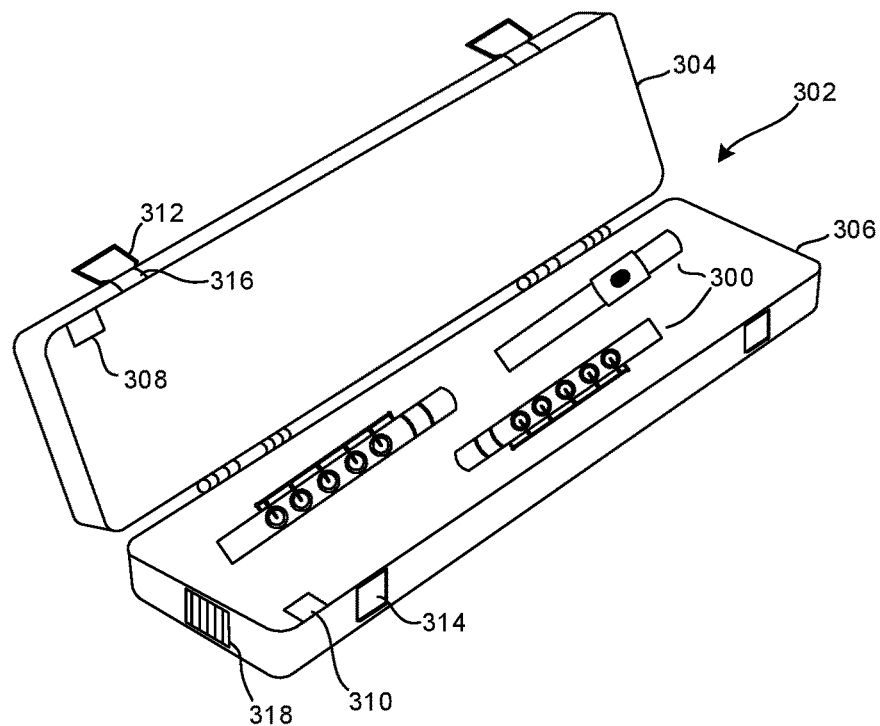
FIG. 3  Flute Case
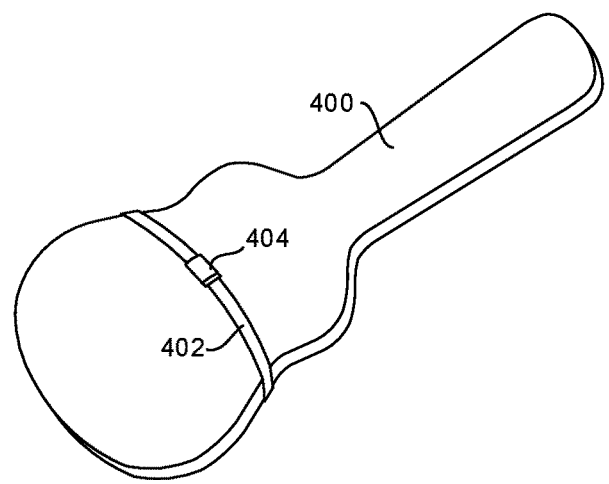
FIG. 4  Guitar Case

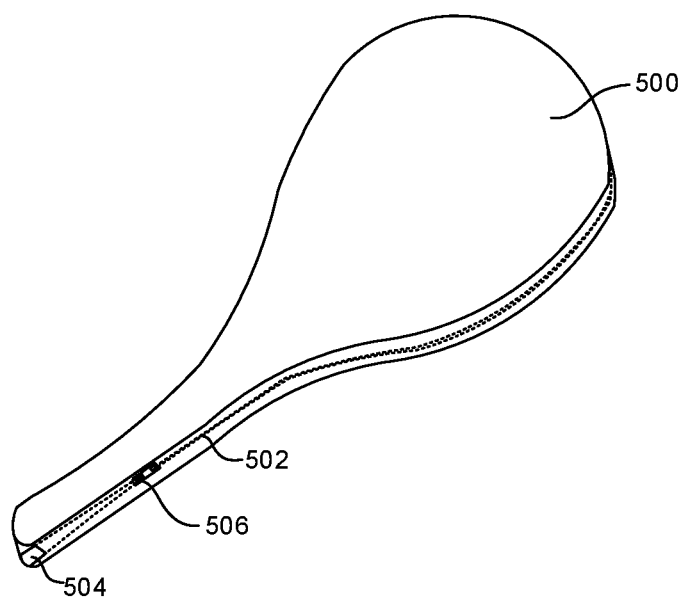
FIG. 5   Tennis racket case
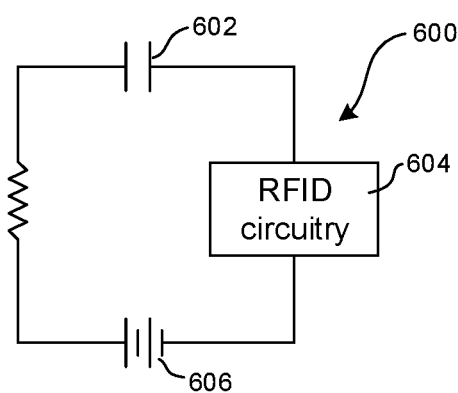
FIG. 6   Block diagram of sensor

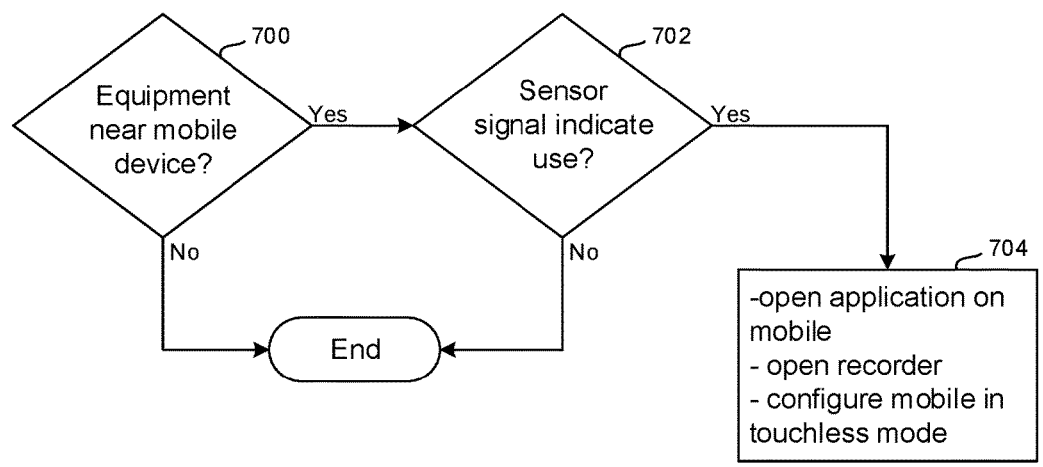
FIG. 7
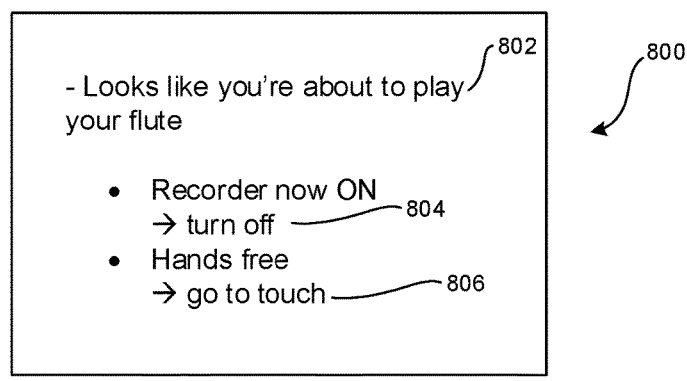
FIG. 8   Example user interface

CONFIGURING MOBILE DEVICE IN AN ACTIVITY CONFIGURATION RESPONSIVE TO A RECREATIONAL IMPLEMENT BEING IN A USE CONFIGURATION

FIELD

The present application relates to technically inventive, non-routine solutions that are necessarily rooted in computer technology and that produce concrete technical improvements.

BACKGROUND

People love to play musical instruments either for fun or to master an art. With improving technologies, several musical instrument-based applications available in smartphones or tablets help users improve their musical skills by, e.g., supporting practice with a metronome sound to mark time at a selected rate, recording/playing supporting music/lyrics in the background, etc. As with music, fitness and sports-related activities are a large and lucrative industry, and many users engaging in such activities desire their phones to be converted into smart sport/fitness companion.

SUMMARY

As understood herein, a user typically must activate supporting computer applications manually, breaking his rhythm and concentration. It is therefore desired to have a more intelligent system to understand and cater to user needs.

Accordingly, in one aspect storage that is not a transitory signal includes instructions executable by at least one processor to identify whether at least one human-manipulable implement is proximate to the device. The instructions are also executable to identify whether at least one signal from at least one sensor assembly associated with the implement indicates a use condition, and responsive to identifying both that the human-manipulable implement is proximate to the device and that at least one signal from the at least one sensor assembly indicates a use condition, invoke an activity configuration on the device. The instructions are also executable to, responsive to identifying either that the human-manipulable implement is not proximate to the device or that at least one signal from the at least one sensor assembly does not indicate a use condition, not invoke the activity configuration on the device.

In some examples the sensor assembly generates a first signal responsive to a storage container associated with the implement being in a closed configuration and a second signal responsive to the storage container being in an open configuration, and the instructions are executable to identify that the first signal from the at least one sensor assembly indicates a use condition, and that the second signal from the at least one sensor assembly does not indicate a use condition.

In example implementations, the sensor assembly includes first and second contacts arranged on first and second portions of the container. The first portion is movable relative to the second portion to open or close the container. In other examples, the sensor assembly includes at least one contact on a strap of the container.

In non-limiting embodiments, the computer application is associated with the human-manipulable implement. Without limitation, the human-manipulable implement can include a musical instrument or a sports device/gear/equipment. In examples, the sensor assembly includes a sensor selected from the group consisting of: motion sensors, orientation sensors, heat sensors, contact sensors, vibration sensors, capacitance sensors, force sensors.

In some embodiments, the activity configuration includes invoking a computer application on the device. Additionally or alternatively, the activity configuration can include activating audio recording on the device. Additionally or alternatively, the activity configuration can include configuring the device into a touch-less mode in which voice and/or gesture input is actuated.

In another aspect, a method includes identifying whether a recreational implement is proximate to a computing device, and identifying whether the recreational implement is in a use state. The method includes establishing an activity configuration of the computing device responsive to identifying that the recreational implement is proximate thereto and is in a use state. On the other hand, the method includes not establishing the activity configuration of the computing device responsive to identifying that the recreational implement is not proximate thereto or is not in a use state.

In another aspect, an apparatus includes at least a first processor, at least one network adapter, and storage with instructions executable by the first processor for receiving a sensor signal indicating a state of a recreational implement. The instructions are executable for, responsive to the signal indicating a use state, configuring the apparatus in an activity configuration. Also, the instructions are executable for, responsive to the signal not indicating a use state, not configuring the apparatus in the activity configuration.

The details of present principles, both as to their structure and operation, can best be understood in reference to the accompanying drawings, in which like reference numerals refer to like parts, and in which:

BRIEF DESCRIPTION OF THE DRAWINGS

FIG. 3 is a diagram of a musical instrument case (using a flute as an example) illustrating two techniques for implementing present principles;

FIG. 4 is a diagram of a musical instrument case (using a guitar as an example) illustrating another technique for implementing present principles;

FIG. 5 is a diagram of a sports implement case (using a tennis racket as an example) illustrating yet another technique for implementing present principles;

FIG. 6 is a schematic diagram of a simplified sensor assembly circuit consistent with present principles;

FIG. 7 is a flow chart of example logic consistent with present principles;

FIG. 8 is a screen shot of an example user interface (UI) that may be implemented;

DETAILED DESCRIPTION

Figure 1:
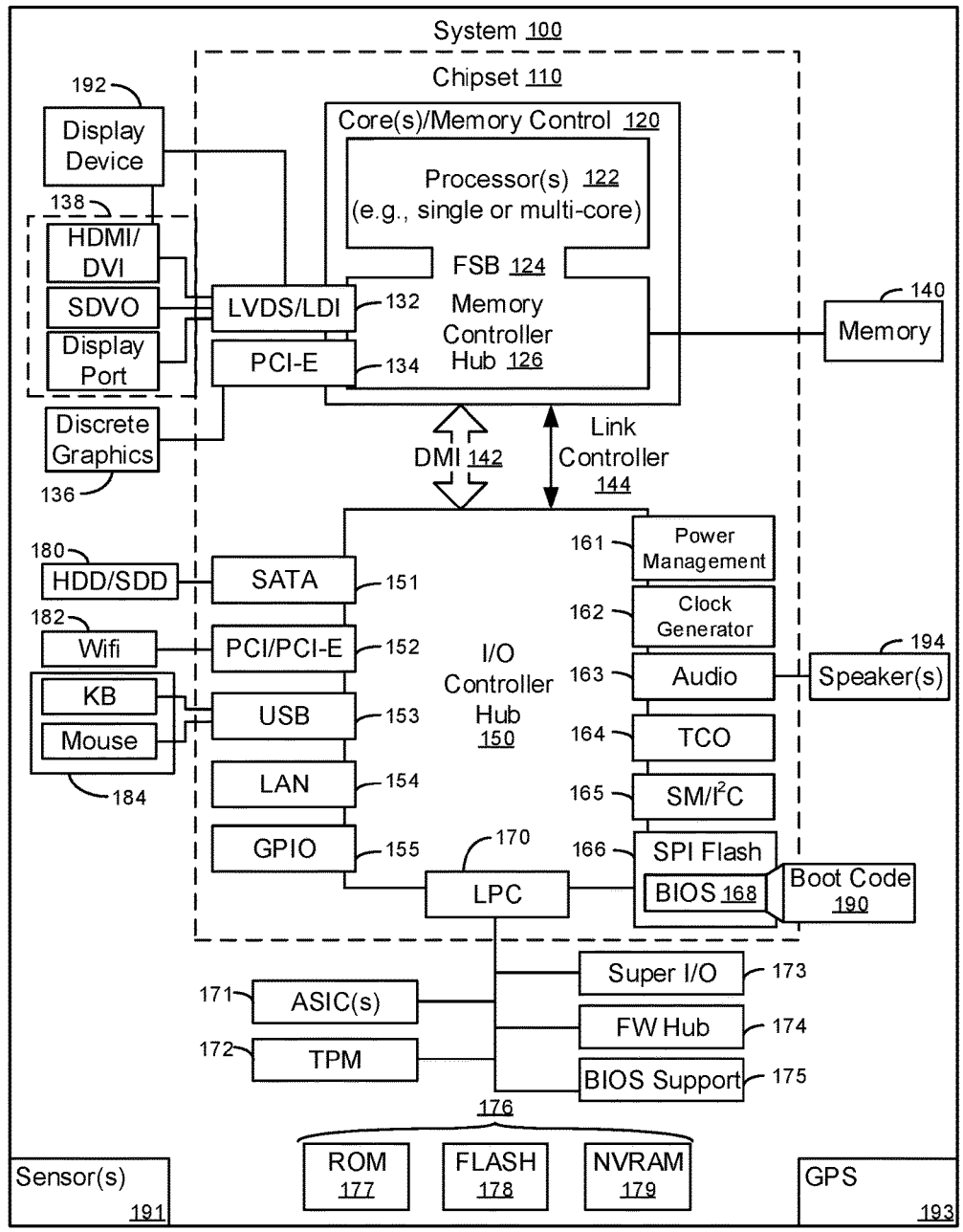
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, and a LAN interface 154 (more generally a network interface for communication over at least one network such as the Internet, a WAN, a LAN, etc. under direction of the processor(s) 122). The interface 154 may be a near field communication (NFC) interface such as but not limited to radiofrequency identification (RFID) interface, a Bluetooth Low Energy (BLE) interface, or the interface 154 may be a Wi-Fi interface.

The example of FIG. 1 may also include a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191 from which input may be received for the system 100. For example, the sensor 191 may be an audio receiver/microphone that provides input from the microphone to the processor 122 based on audio that is detected, such as via a user providing audible input to the microphone, so that the user may be identified based on voice identification. As another example, the sensor 191 may be a camera that gathers one or more images and provides input related thereto to the processor 122 so that the user may be identified based on facial recognition or other biometric recognition. The camera may be a thermal imaging camera, a digital camera such as a webcam, a three-dimensional (3D) camera, and/or a camera otherwise integrated into the system 100 and controllable by the processor 122 to gather pictures/images and/or video. The sensor 191 may also be, for instance, another kind of biometric sensor for use for such purposes, such as a fingerprint reader, a pulse monitor, a heat sensor, etc. The sensor 191 may be a pressure or heat sensor.

The sensor 191 may even be a motion sensor such as a gyroscope that senses and/or measures the orientation of the system 100 and provides input related thereto to the processor 122, and/or an accelerometer that senses acceleration and/or movement of the system 100 and provides input related thereto to the processor 122. Thus, unique and/or particular motion or motion patterns may be identified to identify a user as being associated with those motions/patterns in accordance with present principles.

Additionally, the system 100 may include a location sensor such as but not limited to a global positioning satellite (GPS) transceiver 193 that is configured to receive geographic position information from at least one satellite and provide the information to the processor 122. However, it is to be understood that another suitable position receiver other than a GPS receiver may be used in accordance with present principles to determine the location of the system 100. In some embodiments, the GPS transceiver 193 may even establish a sensor for use in accordance with present principles to identify a particular user based on the user being associated with a particular location (e.g., a particular building, a particular location within a room of a personal residence, etc.)

It is to be understood that an example client device or other machine/computer may include fewer or more features than shown on the system 100 of FIG. 1. In any case, it is to be understood at least based on the foregoing that the system 100 is configured to undertake present principles.

Figure 2:
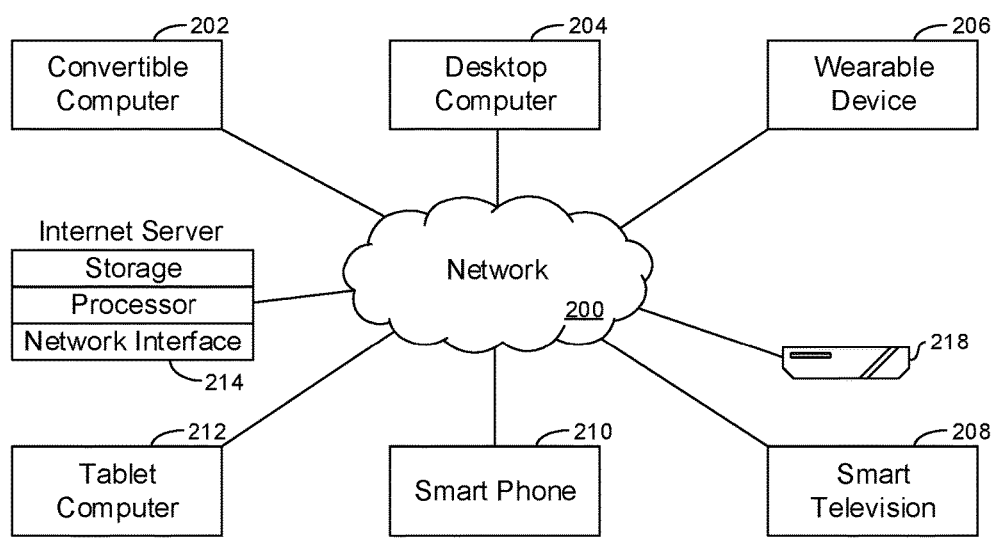
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a server 214 such as an Internet server that may provide cloud storage accessible to the devices shown in FIG. 2, and a container 218 for holding, e.g., a musical instrument or sports implement. It is to be understood that the devices shown in FIG. 2 are configured to communicate with each other over the network 200 to undertake present principles.

Now referring to FIG. 3, a human-manipulable implement 300 is shown disposed in a container 302 for carrying the implement. In the example of FIG. 3, the implement is a flute (shown separated into three pieces for storage as is typical). The container 302 in the example shown includes first and second rigid portions 304, 306 that are hingedly connected for clamshell-like motion between an open configuration shown, in which access to the flute is provided, and a closed configuration in which the flute is wholly within the container.

For illustration purposes, FIG. 3 shows two techniques for sensing whether the container 302 is open or closed, it being understood that in implementation only one technique may be used. In a first technique, first and second contacts 308, 310 may be disposed on the respective portions 304, 306 of the container 302 and may be metal. When the container is closed, the contacts 308, 310 may context each other to complete an electrical circuit, described further below. When the container is open, the electrical circuit likewise may be open because the contacts 308, 310 do not touch each other.

Alternatively, since the flute case shown in the example of FIG. 3 typically is equipped with left and right latch mechanisms each including a respective upper latch 312 that can engage a respective lower latch 314 to hold the container 300 closed, at least one metal contact 316 can be provided on at least one or if preferred both latch mechanisms to complete an electrical circuit when the case is closed.

The musical instrument (more generally, the human-manipulable implement) and/or its container (as shown in FIG. 3) may also include a presence transmitter 318 that generates a typically short range signal that can be detected by a computing device such as any of the devices shown herein to indicate to the computing device that the implement 300/container 302 is proximate to the computing device.

FIG. 4 illustrates another technique using a guitar case 400 for holding a guitar. A closure strap 402 includes a buckle 404 that can engage otherwise free ends of the strap to hold the case 400 closed. A contact such as those described above can close an electrical circuit only when the buckle is engaged in the closed position. In other embodiments the strap 402 may be on the guitar itself, covering the strings of the guitar when the guitar is not in use.

FIG. 5 shows yet another technique, using as an example of a container 500 for a human-manipulable implement a tennis racket case with a zipper 502 that can be moved to open and close the interior of the case. A contact 504 can touch the slider 506 of the zipper only when the slider is substantially in the closed position, to thereby complete an electrical circuit.

FIG. 6 shows a sensor 600 that includes a contact 602 that is closed when any of the example containers discussed above are closed. The contact is open when the container is open. When closed, sensor circuitry 604 is energized by a power supply 606 such as a battery. The sensor circuitry may include, without limitation, RFID circuitry, BLE circuitry, or Wi-Fi circuitry. When energized, the sensor circuitry generates a signal that may be detected by a mobile device or other computing device such as any of those described above to indicate that the container is closed.

It is to be understood that while the examples herein assume a circuit is completed when a container is closed, equivalently the circuit may be opened when the container is closed, with the components of the circuit being selected appropriately, e.g., by using a shunt in parallel with the main power line in which the contact is in series such that opening the contact causes current to flow through the shunt to the circuitry. It is to be further understood that while the above example assumes a sensor being energized when the container is closed to indicate "no use", in other equivalent embodiments the contacts described above may be arranged physically and electrically to transmit a signal only when the container is open, with such a signal indicating that a use or activity condition is present.

FIG. 7 illustrates how the computing device associated with the human-manipulable implement with container ("equipment") may operate, consistent with present principles. Commencing at decision diamond 700, it is determined whether the equipment is proximate the computing device. This may be done in one embodiment by determining whether a received signal strength indicator (RSSI) from, e.g., the transmitter 318 in FIG. 3 meets a signal strength criteria. This is a first condition which partially indicates that a user may use the implement.

To cleanly differentiate between user carrying around the implement versus using/playing the sports good or musical instrument, the logic moves to decision diamond 702, assuming the test at decision diamond 700 was positive. At decision diamond 702, it is determined whether a signal from a sensor such as the sensor 600 shown in FIG. 6 indicates a use condition, such as the associated container being open (or not being fully closed). This is the second use condition.

As shown in FIG. 7, only when both tests at decision diamonds 700, 702 are satisfied does the logic move to block 704, to establish an activity configuration of the mobile device. Otherwise, i.e., if either condition fails, the logic ends at state 706.

Without limitation, the activity configuration can include invoking a computer application on the device. In addition or alternatively, the activity configuration can include activating audio recording on the device. In addition or alternatively, the activity configuration can include configuring the device into a touch-less mode in which voice and/or gesture input is actuated.

In case of baseball bats/golf clubs/tennis rackets, the strap of FIG. 4 can be used to cover the bat/golf club/tennis racket handle which needs to be removed when user plays golf.

In an alternate embodiment, usage of vibrations, movements, pressure, heat, or force sensors can detect when the instrument/sports gear is being used to configure the computing device in the use or activity configuration. Thus in such cases, in the opening/chord of a musical instrument such as flute or guitar can be detected by a vibration sensor when the user starts blowing into the flute or playing the guitar, generating a signal indicating use. Heating of the device as indicated by a temperature sensor such as a thermocouple may also be used to indicate use.

FIG. 8 illustrates a UI 800 that may be presented on a display 802 of any of the computing devices described herein to indicate to the user that the user appears to be using a human-manipulable implement that is associated with an activity configuration of the computing device. A prompt 802 may be presented indicating to the user that use of the implement is or appears will be occurring soon, according to description above. A first selector 804 may be provided and is selectable to turn off an audio recorder, which is indicated as shown as being "on" responsive to invocation of the activity configuration on the device. A second selector 806 similarly may be provided and is selectable to turn off the touchless input mode, which is indicated as shown as being "on" responsive to invocation of the activity configuration on the device, and revert to touch input.

Note that while certain examples above illustrate both a proximity sensor and a use sensor, in other embodiments the two sensors may be unified, such that only in a condition of use would a proximity sensor be activated. Detection of an RSSI from the proximity sensor meeting a threshold under these circumstances would satisfy both the proximity condition (as described above) as well as the use condition, since the proximity sensor would be deenergized when the sensor 600 of FIG. 6 (or other equivalent sensor assembly) indicates non-use.

Figure 9:
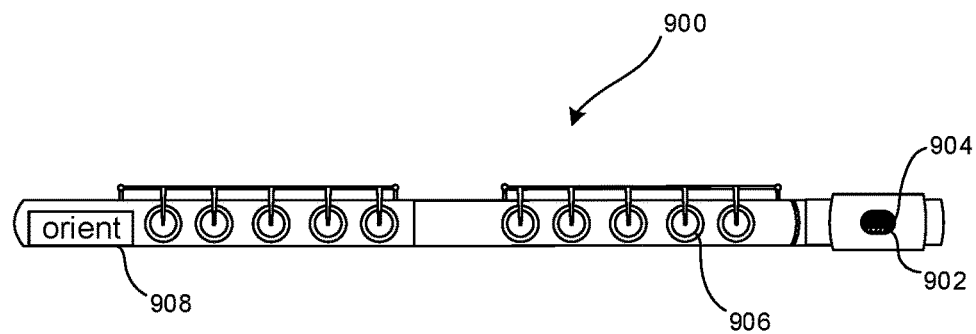
FIG. 9 is a diagram of an example implement embodied as a flute, schematically showing various use sensors that may be employed.

Now referring to FIG. 9, as mentioned above usage of vibrations, movements, pressure or heat sensors can detect when the instrument/sports gear is being used to configure the computing device in the use or activity configuration. To this end, a use sensor may be coupled directly to the implement instead of or in addition to a use sensor on a container of the implement.

An implement 900 that for illustration is configured as a flute may thus include one or more vibration sensors 902 (such as, e.g., piezoelectric sensors) for detecting when a musician blows through the blow hole 904 of the flute. When the musician starts blowing into the flute, the sensor 904 generates a signal indicating use.

In addition or alternatively, an implement 900 may include a contact sensor 906 disposed on a surface (in the example shown, one or more of the keys of the flute) of the implement that is ordinarily contacted by a user during use of the implement. In some examples, the contact sensor 906 may be a heat or temperature sensor such as a thermocouple. More generally, heat sensors may be used on areas of implements that typically become warm during use. Or, the contact sensor 906 may be established by capacitance contact sensor or other type of contact sensor such as a force sensor (e.g., a force sensing resistor assembly).

In addition or alternatively, an implement 900 may include a motion or orientation sensor 908 such as but not limited to a gyroscope or an accelerometer. As an example, the signal from an orientation sensor 908 can indicate an orientation of the implement which indicates whether the implement is in an orientation normally associated with use. For example, a flute is normally roughly horizontal when being played. When the sensor 908 is implemented by a motion sensor, it may indicate motion of the implement to indicate use. As an example, a baseball bat or tennis racket in use undergoes characteristic motion, and when the signal from the motion satisfies a match criteria with the characteristic motion, use is indicated.

Any of the proximity and/or use sensors herein may, in addition to returning signals indicating proximity/use, may indicate an identification of the implement with which they are associated, so that the receiving device knows what type of implement to configure itself for.

For "use" to be returned, e.g., at state 702 in FIG. 7 or in FIG. 10 below, at least one of the use sensors may be required to return a signal indicating use. When plural use sensors are provided, at least one signal indicating use from one of the sensors may be sufficient to return a "use" determination. In other examples, signals indicating use from any combination of two or more use sensors may be required before a determination of "use" is made.

Yet another use sensor may be the microphone on the mobile device itself. The microphone may be established by, e.g., the sensor 191 shown in FIG. 1 and described above. In this embodiment, sound from the microphone is digitized and compared to a data structure of audio fingerprints to determine if the sound satisfies a match criteria with one of the fingerprints, indicating use. In the flute example, sound from a microphone that matches a flute fingerprint can indicate that the flute is being used.

Figure 10:
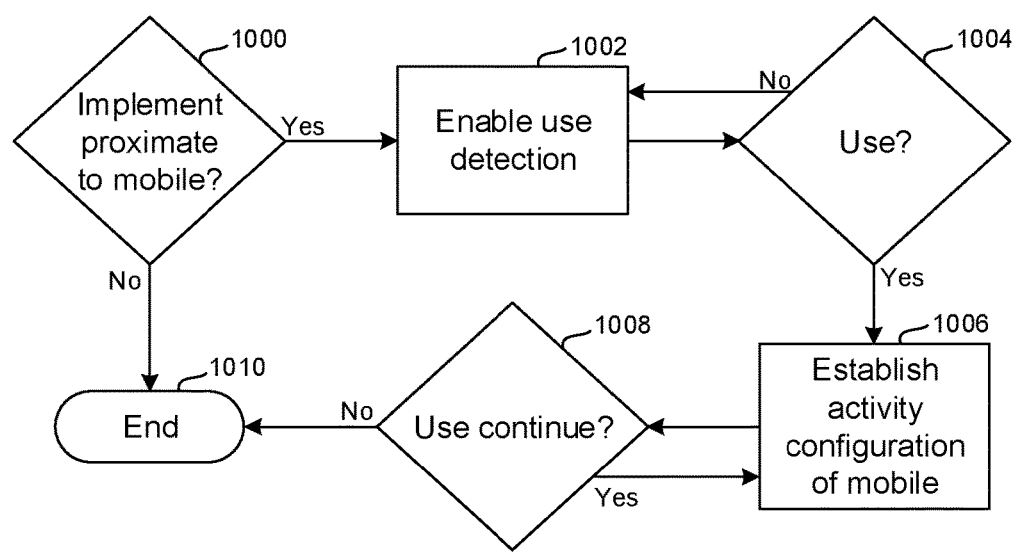
FIG. 10 is a flow chart of further logic consistent with present principles.

FIG. 10 provides additional details of example logic that may be executed consistent with present principles. Commencing at decision diamond 1000, it is determined, e.g., by the user's mobile device as described previously, whether the music/sports implement is proximate to the mobile device. If it is, the logic can flow to block 1002 to enable use detection by, e.g., enabling input from the microphone of the device, which otherwise may be maintained deenergized when the implement (e.g., a flute or musical instrument) is not proximate to the mobile device.

Proceeding from state 1002 to state 1004, it may be determined whether the implement is actually being used. This may be done using any of the examples discussed previously. For instance, if the implement is a flute, it may be determined whether any one or more of the sensors 902, 906, 908 indicate use, and/or whether the digitized signal from the microphone matches a stored audio fingerprint of a flute. In the baseball bat example, it can be determined whether the signal from the accelerometer indicated that the bat is being swung in a way characteristic of use during play.

If it is determined at state 1004 that the implement is in use, the logic may move to state 1006 to establish an activity configuration on the mobile device according to principles discussed above. Use can continue to be monitored at state 1008, e.g., when the signal from the microphone indicates that the flute is no longer being played (typically for at least a threshold timeout period), the activity configuration of the mobile device can be suspended or otherwise ended at state 1010. As long as use continues, the activity configuration of the mobile device may be maintained until such time as the user might decide to manually terminate the activity configuration.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   computer storage accessible to at least one processor, the computer storage not being a transitory signal and comprising instructions executable by the at least one processor to perform a method comprising:
   identifying whether a recreational implement is proximate to a mobile computing device;
   identifying whether the recreational implement is in a use state;
   establishing an activity configuration of the mobile computing device responsive to identifying that the recreational implement is in a use state; and not establishing the activity configuration of the mobile computing device responsive to identifying that the recreational implement is not in a use state;

presenting on an output device as part of the activity configuration at least one user interface (UI) comprising:

at least one indication related to the recreational implement;

at least a first selector selectable to turn off an audio recorder, which is configured to be "on" responsive to a signal indicating the recreational implement is in the use state;

at least a second selector selectable to turn off touchless input mode, which is configured to be "on" responsive to the signal indicating the recreational implement is in the use state.

2. The device of claim 1, comprising the at least one processor, wherein the instructions are executable by the at least one processor to:

identify, based at least in part on a signal transmitted from at least one transmitter, whether the recreational implement is proximate to the mobile computing device;

identify whether at least one signal from at least one sensor assembly associated with the recreational implement indicates the use state, the at least one sensor assembly being different from the at least one transmitter;

responsive to identifying both that the recreational implement is proximate to the mobile computing device and that at least one signal from the at least one sensor assembly indicates the use state, invoke the activity configuration; and responsive to identifying either that the recreational implement is not proximate to the mobile computing device or that at least one signal from the at least one sensor assembly does not indicate the use state, not invoke the activity configuration.

3. The device of claim 2, wherein the recreational implement comprises a human-manipulable implement and the at least one sensor assembly generates a first signal responsive to a container associated with the human-manipulable implement being in a closed configuration and a second signal responsive to the container being in an open configuration, and the instructions are executable to identify that the first signal from the at least one sensor assembly indicates the use state, and that the second signal from the at least one sensor assembly does not indicate the use state.

4. The device of claim 3, wherein the at least one sensor assembly includes at least one of: first and second contacts arranged on first and second portions of the container, the first portion being movable relative to the second portion to open or close the container; at least one contact on a strap of the container.

5. The device of claim 2, wherein the at least one sensor assembly is coupled directly to the recreational implement and generates a first signal responsive to use of the recreational implement, and the instructions are executable to identify that the first signal from the at least one sensor assembly indicates the use state, the at least one sensor assembly comprising at least one sensor selected from the group consisting of: motion sensors, orientation sensors, heat sensors, contact sensors, vibration sensors, capacitance sensors, force sensors.

6. The device of claim 1, wherein the recreational implement includes a musical instrument.

7. The device of claim 1, wherein the recreational implement includes a sports device.

8. The device of claim 1, wherein the activity configuration includes invoking a computer application on the device.

9. The device of claim 1, wherein the activity configuration includes activating audio recording on the device.

10. The device of claim 1, wherein the activity configuration includes configuring the device into a touch-less mode in which gesture input is actuated.

11. A method, comprising:

identifying whether a recreational implement is proximate to a mobile computing device;

identifying whether the recreational implement is in a use state;

establishing an activity configuration of the mobile computing device responsive to identifying that the recreational implement is in a use state; and not establishing the activity configuration of the mobile computing device responsive to identifying that the recreational implement is not in a use state;

presenting on an output device as part of the activity configuration at least one user interface (UI) comprising:

at least one indication related to the recreational implement;

at least a first selector selectable to turn off an audio recorder, which is configured to be "on" responsive to a signal indicating the recreational implement is in the use state;

at least a second selector selectable to turn off touchless input mode, which is configured to be "on" responsive to the signal indicating the recreational implement is in the use state.

12. The method of claim 11, wherein the recreational implement includes a musical instrument or a sports device.

13. The method of claim 11, wherein identifying the use state comprises receiving signals from a sensor assembly comprising at least one sensor selected from the group consisting of: motion sensors, orientation sensors, heat sensors, contact sensors, vibration sensors, capacitance sensors, force sensors.

14. The method of claim 11, wherein the activity configuration includes invoking a computer application on the mobile computing device.

15. The method of claim 11, wherein the activity configuration includes activating audio recording on the mobile computing device.

16. The method of claim 11, wherein the activity configuration includes configuring the mobile computing device into a touch-less mode in which voice and/or gesture input is actuated.

17. An apparatus, comprising:

at least a first processor;

at least one network adapter; and storage with instructions executable by the at least first processor for:

receiving a sensor signal indicating a state of a recreational implement;

responsive to the signal indicating a use state, configuring the apparatus in an activity configuration; and responsive to the signal not indicating a use state, not configuring the apparatus in the activity configuration, wherein the apparatus comprises an output device and the activity configuration comprises presentation of at least one user interface (UI) on the output device, the at least one UI comprising:

at least one indication that a user is using a recreational implement;

at least a first selector selectable to turn off an audio recorder, which is configured to be "on" responsive to the signal indicating the recreational implement is in the use state;

at least a second selector selectable to turn off touchless input mode, which is configured to be "on" responsive to the signal indicating the recreational implement is in the use state.

18. The apparatus of claim 17, wherein the recreational implement includes a musical instrument.

19. The apparatus of claim 17, wherein the recreational implement includes sporting gear.

20. The apparatus of claim 17, wherein the instructions are executable for:

determining whether the recreational implement is proximate the apparatus;

responsive to determining that the recreational implement is proximate the apparatus and that the signal indicates a use state, configuring the apparatus in an activity configuration.

* * * * *